(12) United States Patent
Koren et al.

(10) Patent No.: US 8,121,651 B2
(45) Date of Patent: Feb. 21, 2012

(54) CONTENT PERSONALIZATION OF PERSONAL CELLULAR TELECOMMUNICATIONS DEVICES

(75) Inventors: Eyal Koren, Moshav Herut (IL); Uri Neria, Chofit (IL); Amit Gil, Yehud (IL)

(73) Assignee: Celltick Technologies Ltd., Herzliya (IL)

( * ) Notice: Subject to any disclaimer, the term of this patent is extended or adjusted under 35 U.S.C. 154(b) by 800 days.

(21) Appl. No.: 12/223,806

(22) PCT Filed: Feb. 11, 2007

(86) PCT No.: PCT/IL2007/000187
§ 371 (c)(1),
(2), (4) Date: Aug. 11, 2008

(87) PCT Pub. No.: WO2007/091272
PCT Pub. Date: Aug. 16, 2007

(65) Prior Publication Data
US 2010/0016025 A1    Jan. 21, 2010

(30) Foreign Application Priority Data
Feb. 12, 2006    (IL) .......................................... 173663

(51) Int. Cl.
*H04M 1/00*    (2006.01)
(52) U.S. Cl. ........................ 455/566; 455/403
(58) Field of Classification Search .......... 455/422, 455/466, 566, 414, 403
See application file for complete search history.

(56) References Cited

U.S. PATENT DOCUMENTS

| | | |
|---|---|---|
| 5,226,177 A | 7/1993 | Nickerson |
| 5,553,314 A | 9/1996 | Grube et al. |
| 5,555,446 A | 9/1996 | Jasinski |
| 5,687,216 A | 11/1997 | Svensson |
| 5,692,032 A | 11/1997 | Seppanen et al. |
| 5,701,580 A | 12/1997 | Yamane et al. |
| 5,812,647 A * | 9/1998 | Beaumont et al. ............ 379/111 |
| 5,822,402 A | 10/1998 | Marszalek |

(Continued)

FOREIGN PATENT DOCUMENTS

EP    0955779    11/1999

(Continued)

OTHER PUBLICATIONS

Global System for Mobile Communications, Digital Cellular Telecommunications System (Phase 2+) (GSM); Universal Mobile Telecommunications System (UMTS); USIM Application Toolkit (USAT); (3 GPP TS 31.111 (Dec. 2000) version 3.3.0; 1999); pp. 1-136.

(Continued)

*Primary Examiner* — Dwayne Bost
*Assistant Examiner* — Myron Wyche
(74) *Attorney, Agent, or Firm* — Pearl Cohen Zedek Latzer, LLP

(57) ABSTRACT

Content personalization on personal cellular telecommunications devices includes determining subscriber personalization profiles each including at least one personalization parameter, determining universal Level 0 IDMs for display on all subscribers' personal cellular telecommunications devices irrespective of their location and their subscriber personalization profiles, and determining a set of at least two different personalized Level 1 IDMs for each universal Level 0 IDM for display on subscribers' personal cellular telecommunications depending on their location and subscriber personalization profiles. Personalization of Level 1 interactive display messages can take place either network side or handset side. Network side personalization requires a personalization server with subscribers' personalization profiles. Handset side personalization requires handset subscriber personalization filters.

14 Claims, 8 Drawing Sheets

U.S. PATENT DOCUMENTS

| | | |
|---|---|---|
| 5,870,030 A | 2/1999 | DeLuca et al. |
| 5,878,033 A | 3/1999 | Mouly |
| 5,926,104 A | 7/1999 | Robinson |
| 5,960,366 A | 9/1999 | Duwaer |
| 6,018,522 A | 1/2000 | Schultz |
| 6,060,997 A | 5/2000 | Taubenheim et al. |
| 6,064,376 A | 5/2000 | Berezowski et al. |
| 6,169,882 B1 | 1/2001 | Amma |
| 6,173,316 B1 | 1/2001 | De Boor et al. |
| 6,212,203 B1 | 4/2001 | Anderson et al. |
| 6,230,019 B1 | 5/2001 | Lee |
| 6,298,239 B1 | 10/2001 | Yonemoto et al. |
| 6,341,228 B1 | 1/2002 | Hubbe et al. |
| 6,363,419 B1 | 3/2002 | Martin, Jr. et al. |
| 6,370,389 B1 | 4/2002 | Isomursu et al. |
| 6,385,461 B1 | 5/2002 | Raith |
| 6,413,160 B1 | 7/2002 | Vancura |
| 6,416,414 B1 | 7/2002 | Stadelmann |
| 6,418,308 B1 | 7/2002 | Heinonen et al. |
| 6,434,398 B1 | 8/2002 | Inselberg |
| 6,441,720 B1 | 8/2002 | Kawashima |
| 6,442,529 B1 | 8/2002 | Krishan et al. |
| 6,443,840 B2 | 9/2002 | Von Kohorn |
| 6,484,148 B1 | 11/2002 | Boyd |
| 6,505,046 B1 | 1/2003 | Baker |
| 6,522,876 B1 * | 2/2003 | Weiland et al. ............ 455/414.1 |
| 6,522,877 B1 | 2/2003 | Lietsalmi et al. |
| 6,583,714 B1 | 6/2003 | Gabou et al. |
| 6,615,039 B1 | 9/2003 | Eldering |
| 6,628,936 B1 | 9/2003 | Furuya |
| 6,671,715 B1 | 12/2003 | Langseth et al. |
| 6,688,982 B2 | 2/2004 | Moodie et al. |
| 6,745,011 B1 | 6/2004 | Hendrickson et al. |
| 6,807,254 B1 | 10/2004 | Guedalia et al. |
| 6,832,314 B1 | 12/2004 | Irvin |
| 6,968,175 B2 | 11/2005 | Raivisto et al. |
| 6,970,712 B1 | 11/2005 | Vo |
| 7,003,327 B1 | 2/2006 | Payne et al. |
| 7,028,261 B2 | 4/2006 | Smyth et al. |
| 7,039,423 B2 | 5/2006 | Daniel et al. |
| 7,096,044 B2 | 8/2006 | Gil et al. |
| 7,113,809 B2 | 9/2006 | Noesgaard et al. |
| 7,158,753 B2 | 1/2007 | Kagan et al. |
| 7,181,225 B1 | 2/2007 | Moton, Jr. et al. |
| 7,191,343 B2 | 3/2007 | Tuoriniemi et al. |
| 7,219,123 B1 | 5/2007 | Ficchter et al. |
| 7,251,476 B2 | 7/2007 | Cortegiano |
| 7,370,283 B2 | 5/2008 | Othmer |
| 7,551,913 B1 | 6/2009 | Chien |
| 7,551,919 B2 | 6/2009 | Cortegiano |
| 7,561,899 B2 | 7/2009 | Lee |
| 7,689,167 B2 | 3/2010 | Sengupta et al. |
| 7,779,023 B2 | 8/2010 | Smyth et al. |
| 7,801,541 B2 | 9/2010 | Daniel et al. |
| 7,860,951 B2 | 12/2010 | Gil et al. |
| 2001/0003099 A1 | 6/2001 | Von Kohorn |
| 2001/0020957 A1 | 9/2001 | Ringot |
| 2002/0054090 A1 | 5/2002 | Silva et al. |
| 2002/0138331 A1 | 9/2002 | Hosea et al. |
| 2003/0005466 A1 | 1/2003 | Liao |
| 2003/0013439 A1 * | 1/2003 | Daniel et al. ................. 455/422 |
| 2003/0065706 A1 | 4/2003 | Smyth et al. |
| 2003/0181201 A1 | 9/2003 | Bomze et al. |
| 2003/0191653 A1 | 10/2003 | Birnbaum et al. |
| 2003/0229534 A1 | 12/2003 | Frangione et al. |
| 2004/0049419 A1 | 3/2004 | Knight |
| 2004/0077340 A1 | 4/2004 | Forsyth |
| 2004/0078427 A1 | 4/2004 | Gil et al. |
| 2004/0127199 A1 | 7/2004 | Kagan et al. |
| 2004/0157628 A1 | 8/2004 | Daniel et al. |
| 2005/0015307 A1 | 1/2005 | Simpson et al. |
| 2005/0060370 A1 | 3/2005 | Xue et al. |
| 2005/0149618 A1 | 7/2005 | Cheng |
| 2005/0154996 A1 | 7/2005 | Othmer |
| 2005/0213511 A1 | 9/2005 | Reece, Jr. et al. |
| 2005/0222908 A1 | 10/2005 | Altberg et al. |
| 2006/0004627 A1 | 1/2006 | Baluja |
| 2006/0030370 A1 | 2/2006 | Wardimon |
| 2006/0064350 A1 | 3/2006 | Freer |
| 2006/0160578 A1 | 7/2006 | Daniel et al. |
| 2006/0190616 A1 | 8/2006 | Mayerhofer et al. |
| 2006/0204944 A1 | 9/2006 | Preskill |
| 2006/0234696 A1 | 10/2006 | Cho |
| 2007/0021065 A1 | 1/2007 | Sengupta et al. |
| 2007/0055565 A1 | 3/2007 | Baur et al. |
| 2007/0106557 A1 | 5/2007 | Varghese |
| 2007/0123246 A1 | 5/2007 | Daniel et al. |
| 2007/0178889 A1 | 8/2007 | Cortegiano et al. |
| 2007/0218865 A1 | 9/2007 | Daniel et al. |
| 2007/0218882 A1 | 9/2007 | Daniel et al. |
| 2007/0218919 A1 | 9/2007 | Ozulkulu et al. |
| 2007/0276729 A1 | 11/2007 | Freer |
| 2007/0288856 A1 | 12/2007 | Butlin et al. |
| 2008/0021783 A1 | 1/2008 | Varghese |
| 2008/0091518 A1 | 4/2008 | Eisenson et al. |
| 2008/0139224 A1 | 6/2008 | Stone |
| 2008/0160956 A1 | 7/2008 | Jackson et al. |
| 2008/0160970 A1 | 7/2008 | Reddy et al. |
| 2008/0187112 A1 | 8/2008 | Koberstein et al. |
| 2009/0150400 A1 | 6/2009 | Abu-Hakima et al. |
| 2009/0163189 A1 | 6/2009 | Gil et al. |
| 2010/0016025 A1 | 1/2010 | Koren et al. |
| 2010/0081462 A1 | 4/2010 | Neria et al. |
| 2010/0130196 A1 | 5/2010 | Gil et al. |
| 2010/0312643 A1 | 12/2010 | Gil |
| 2011/0098091 A1 | 4/2011 | Daniel et al. |

FOREIGN PATENT DOCUMENTS

| | | |
|---|---|---|
| GB | 2320600 | 6/1998 |
| GB | 2327567 | 1/1999 |
| GB | 2362550 | 11/2001 |
| GB | 2391363 | 2/2004 |
| WO | WO 98/10604 | 3/1998 |
| WO | WO 98/41013 | 9/1998 |
| WO | WO 99/42964 | 8/1999 |
| WO | WO 00/22906 | 4/2000 |
| WO | WO 00/77979 | 12/2000 |
| WO | WO 01/45317 | 6/2001 |
| WO | WO 01/52558 | 7/2001 |
| WO | WO 01/52572 | 7/2001 |
| WO | WO 02/087267 | 10/2002 |

OTHER PUBLICATIONS

Gromakiv, "Mobile Wireless Communication Standards and Systems", Mobile TeleSystems-EcoTrands, (1997), Chapter 4, pp. 67-70, with English translation.

Afanasev, et al., "Evolution of Mobile Networks", (Inventory #5554), Moscow, 2001, pp. 84-87 with English translation.

Office Action issued by the United States Patent and Trademark Office for U.S. Appl. No. 11/798,571 dated Jan. 25, 2010.

Office Action issued by the United States Patent and Trademark Office for U.S. Appl. No. 11/798,571 dated Jun. 28, 2010.

Office Action issued by the United States Patent and Trademark Office for U.S. Appl. No. 11/798,571 dated Dec. 23, 2010.

Office Action issued by the United States Patent and Trademark Office for U.S. Appl. No. 12/982,686 dated May 2, 2011.

Office Action issued by the United States Patent and Trademark Office for U.S. Appl. No. 11/385,650 dated Jun. 26, 2008.

Office Action issued by the United States Patent and Trademark Office for U.S. Appl. No. 11/385,650 dated Jan. 26, 2009.

Office Action issued by the United States Patent and Trademark Office for U.S. Appl. No. 11/385,650 dated Jun. 8, 2009.

Office Action issued by the United States Patent and Trademark Office for U.S. Appl. No. 11/798,572 dated Jun. 25, 2010.

Office Action issued by the United States Patent and Trademark Office for U.S. Appl. No. 11/798,572 dated Jan. 19, 2010.

Office Action issued by the United States Patent and Trademark Office for U.S. Appl. No. 11/798,572 dated Jan. 21, 2011.

Office Action issued by the United States Patent and Trademark Office for U.S. Appl. No. 12/448,254 dated Jul. 25, 2011.

Office Action issued by the United States Patent and Trademark Office for U.S. Appl. No. 12/448,211 dated Aug. 18, 2011.

Office Action issued by the United States Patent and Trademark Office for U.S. Appl. No. 12/227,973 dated Sep. 23, 2011.

Office Action issued by the United States Patent and Trademark Office for U.S. Appl. No. 11/798,571 dated Oct. 14, 2011.
Office Action issued by the United States Patent and Trademark Office for U.S. Appl. No. 11/798,572 dated Oct. 14, 2011.
Office Action issued by the United States Patent and Trademark Office for U.S. Appl. No. 12/452,903 dated Dec. 13, 2011.

* cited by examiner

CONTENT PERSONALIZATION OF PERSONAL CELLULAR TELECOMMUNICATIONS DEVICES

CROSS-REFERENCE TO RELATED APPLICATIONS

This application is the national phase of International Application Serial Number PCT/IL2007/000187 filed 11 Feb. 2007 designating the United States and published in English, the entire contents of which are incorporated herein in its entirety by reference.

FIELD OF THE INVENTION

The invention pertains to content personalization on personal cellular telecommunications devices. For the purpose of the present invention, the term "personal cellular telecommunications device" refers to a wide range of portable handheld electronic devices having small display screens and voice communications capabilities. The term "personal cellular telecommunications device" is intended to include inter alia radio telephones, smart phones, communicators, and the like.

BACKGROUND OF THE INVENTION

Applicant's PCT International Publication No. WO 01/52572 illustrates and describes a cellular telecommunications network capable of transmitting a multi-programming channel 24/7 cellular broadcasting service to a plurality of individually addressable Base Transmitter Stations (BTSs) each providing bidirectional signal coverage over a predefined geographical area ranging from so-called typically indoor pico cells each covering a few square meters through so-called micro cells each covering anywhere from a few tens to a few hundreds of square meters up to cells covering several square kilometers. The BTSs are each capable of transmitting Point-To-MultiPoint (PTMP) display messages and Point-To-Point (PTP) display messages for streaming mostly different content, mostly Interactive Display Messages (IDMs) on personal cellular telecommunications devices. The PTMP display messages are dispatched from a Point-To-MultiPoint Display Message Dispatcher and the PTP display messages are dispatched from a Point-To-Point Display Message Dispatcher. Both the PTMP display messages and the PTP display messages originate at a Display Message Input Entity.

WO 01/52572's FIG. 1 shows two exemplary successive time-sensitive IDMs displayed in a screen saver-like manner replacing a normally displayed idle screen. The IDMs include "NASDAQ DROPS 10% PRESS SND FOR DETAILS" display at 9:00 and "NASDAQ JUMPS 20%" displayed at 9:01. The 9:00 IDM is an example of an IDM prompting a subscriber as to the action required by him to obtain additional information from an information provider. Against this, the 9:01 IDM is an example of an IDM which does not prompt a subscriber as to which action is needed to take to obtain additional information since he is already cognizant of the fact that pressing the SND key will automatically connect him to a suitable information service. Activation of IDMs activates a point-to-point transmission response mechanism from the list of: a voice call; an SMS; a data session, for example, an Internet browsing session, a SIM browsing session, and the like (see WO 01/52572's FIG. 2).

Cellular operators can provide Location Based Services (LBSs) for delivering custom advertising and other information to subscribers based on their location without knowing their identity. Additionally or alternatively, cellular operators can obtain subscriber locations either from a GPS chip built into a subscriber's handset, or using radiolocation and trilateration based on the signal-strength of the closest base transmitter stations, and deliver custom advertising to selected subscribers. LBS applications include inter alia finding the nearest business of a certain type, and the like.

SUMMARY OF THE INVENTION

The present invention is directed towards content personalization on personal cellular telecommunications devices for enhancing mobile experience, increasing subscriber usage of Value Added Services (VAS), and the like. Content personalization includes determining subscriber personalization profiles each including at least one personalization parameter, determining universal Level 0 IDMs for display on all subscribers' personal cellular telecommunications devices irrespective of their location and their subscriber personalization profiles, and determining a set of at least two different personalized Level 1 IDMs for each universal Level 0 IDM for display on subscribers' personal cellular telecommunications depending on their location and subscriber personalization profiles. Universal Level 0 IDMs include a content precursor and at least one response mechanism for requesting a personalized Level 1 IDM associated with the content precursor. Content precursors can include text only, graphics only, combination of text and graphics, and the like. Universal Level 0 IDMs may be displayed as part of a user initiated client application or automatically replacing an idle screen as illustrated and described in the aforesaid Applicant's PCT International Publication No. WO 01/52572, the contents of which are incorporated herein by reference.

Personalized Level 1 IDMs include at least one of the following response mechanisms for requesting additional information regarding its originating Level 0 IDM's content precursor: displaying a link to a WAP page, requesting more info over SMS or MMS, displaying a personalized filled out search box, placing a call to a call center, transmitting a request for a call center to call the subscriber, and displaying an interactive option menu listing at least two response mechanisms. Interactive option menus may include the same type of response mechanism twice, for example, browsing to a WAP page, and browsing to a personalized WAP page. Moreover, content personalization can include two subscribers' personal cellular telecommunications devices at the same location initiating different actions to obtain additional information on invoking the same response mechanism on the same personalized Level 1 IDM by virtue of the subscribers having different subscriber personalization profiles.

Content personalization on personal cellular telecommunications devices in accordance with the present invention can be implemented using PTMP messages only, PTP messages only or combinations of PTMP messages and PTP messages. The use of PTMP messages is advantageous with regards to bandwidth considerations but necessitates handset side personalization. The use of PTP messages facilitates flexibility between handset side personalization and network side personalization which requires the use of a personalization server. Content personalization can be determined by personal details, for example, age, sex, and the like. Content personalization can also be achieved by subscribers actively registering their preferences and interests, by analyzing their click throughs in a recursive process of content personalization, and the like. Moreover, certain content personalization may be required by law, for example, restricting minors to accessing adult rated content, on-line gambling, and the like.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE INVENTION

Figure 1:
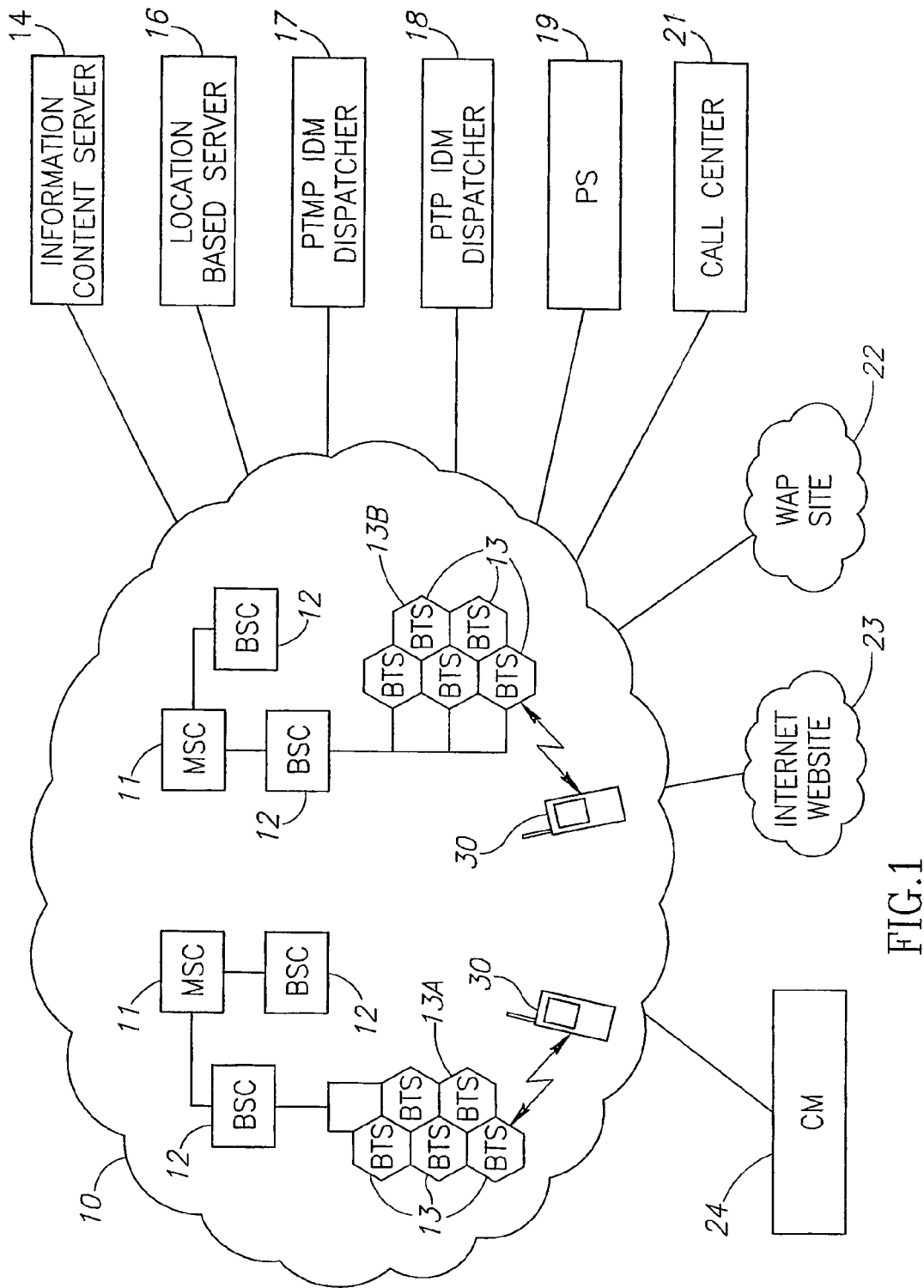
FIG. 1 is a schematic representation of a system for content personalization on personal cellular telecommunications devices in accordance with the present invention.

FIG. 1 shows a cellular telecommunications network 10 including a plurality of Mobile Switching Centers (MSCs) 11, a plurality of Base Station Controllers (BCSs) 12, and a plurality of individually addressable Base Transmitter Stations (BTSs) 13 in bi-directional communication with personal cellular telecommunication devices (hereinafter abbreviated to "devices") 30 operative to display personalized content in accordance with the present invention. For illustrative purposes, the cellular telecommunications network 10 includes a BTS 13A located in Madrid and a BTS 13B located in London. The devices 30 include inter alia simple handset phones, smartphones, combined PDA/phones, combined MP3 music players/phones, and the like. The cellular telecommunications network 10 includes an Information Content Server (ICS) 14 for enabling the preparation of universal Level 0 IDMs and personalized Level 1 IDMs.

Universal Level 0 IDMs include a content precursor and at least one response mechanism for requesting personalized Level 1 IDMs. Personalized Level 1 IDMs include at least one response mechanism for requesting additional information regarding their originating Level 0 IDM's content precursor. The response mechanisms include inter alia displaying a link to a WAP page, requesting more info over SMS or MMS, displaying an empty of filled out search box, placing a call to a call center, transmitting a request for a call center to call the subscriber, and displaying an interactive option menu listing at least two response mechanisms. Interactive option menus may include the same type of response mechanism twice, for example, a link for browsing to a WAP page, and a link for browsing to a personalized WAP page. Filled out search boxes may be personalized.

The cellular telecommunications network 10 includes a Location Based Server (LBS) 16 for providing location based information to the ICS 14, a Point-To-MultiPoint (PTMP) IDM Dispatcher 17 for dispatching PTMP IDMs and a Point-To-Point (PTP) IDM Dispatcher 18 for dispatching PTP IDMs. The cellular telecommunications network 10 preferably includes a Personalization Server (PS) 19 for maintaining subscriber personalization profiles. Subscriber personalization profiles can include personal details, for example, age, sex, and the like, and personalization details regarding a subscriber's interests, hobbies, and the like. Subscriber personalization profiles can also include personalization details regarding a subscriber's dislikes, or particular content which he has specifically requested not be displayed on his device.

The cellular telecommunications network 10 is connected to call centers 21 for enabling subscribers to place and receive phone calls with Customer Service Representatives (CSRs), WAP servers 22 for enabling subscribers to browse to WAP sites and personalized WAP pages, and the Internet 23. The cellular telecommunications network 10 preferably includes a Campaign Manager (CM) 24 for assisting operators to run campaigns and programs, and to analyze subscriber behavior regarding Level 0 IDMs and personalized Level 1 IDMs and also capable of updating the personalization server 19.

Figure 2:
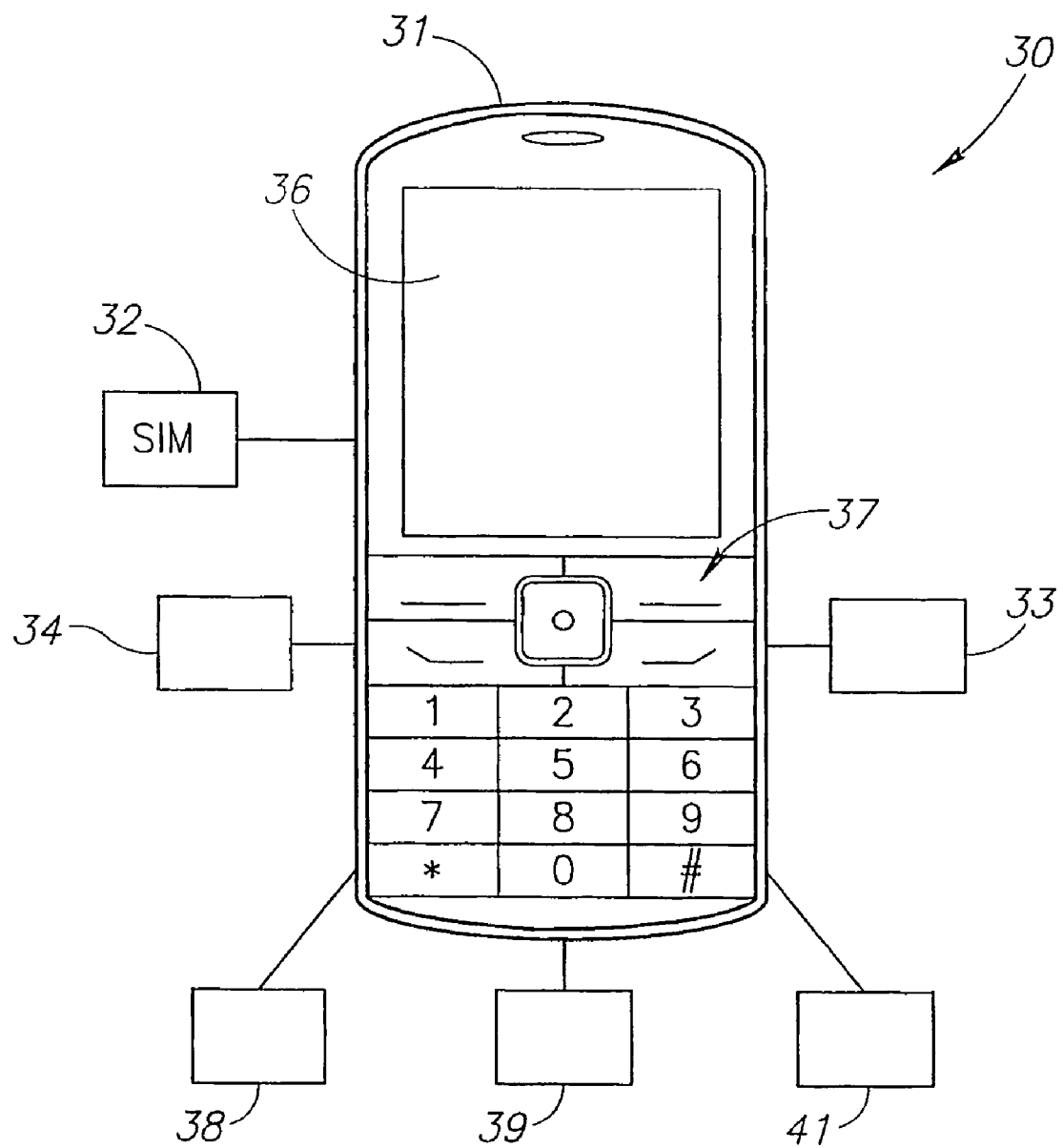
FIG. 2 is a schematic representation of a personal cellular telecommunications device in accordance with the present invention.

FIG. 2 shows a GSM device 30 includes a host Mobile Equipment (ME) 31, and a resident Subscriber Identity Module (SIM) card 32. The host ME 31 has its own unique vendor allocated 15 digit International Mobile Equipment Identification (IMEI) number, for example, 490548400308362. The SIM card 32 has a cellular operated allocated 15 digit International Mobile Subscriber Identity (IMSI) number, for example, 425010100437187. The device 30 includes a cellular network interface 33 for bi-directional interfacing with the cellular telecommunications network 10, an operating system 34 in communication with the cellular network interface 33, a display screen 36, a user interface 37 for inputting instructions, and a memory unit 38 with a buffer 39 for storing IDMs.

The device 30 preferably includes a Subscriber Personalization Filter (SPF) 41 for storing a subscriber personalization profile corresponding to the personalization server 19's subscriber personalization profile for the same subscriber. However, the content personalization can be achieved with only one of the personalization server 19 and the SPFs 41 depending on the transmission technology employed for transmitting IDMs to servers as described hereinbelow. In the case of the provision of both the personalization server 19 and the SPFs 41, they are preferably synchronized each time one of them is updated either by a subscriber actively changing his personalization profile or through an automatic personalization process, for example, based on analyzing his click throughs.

Figure 3:
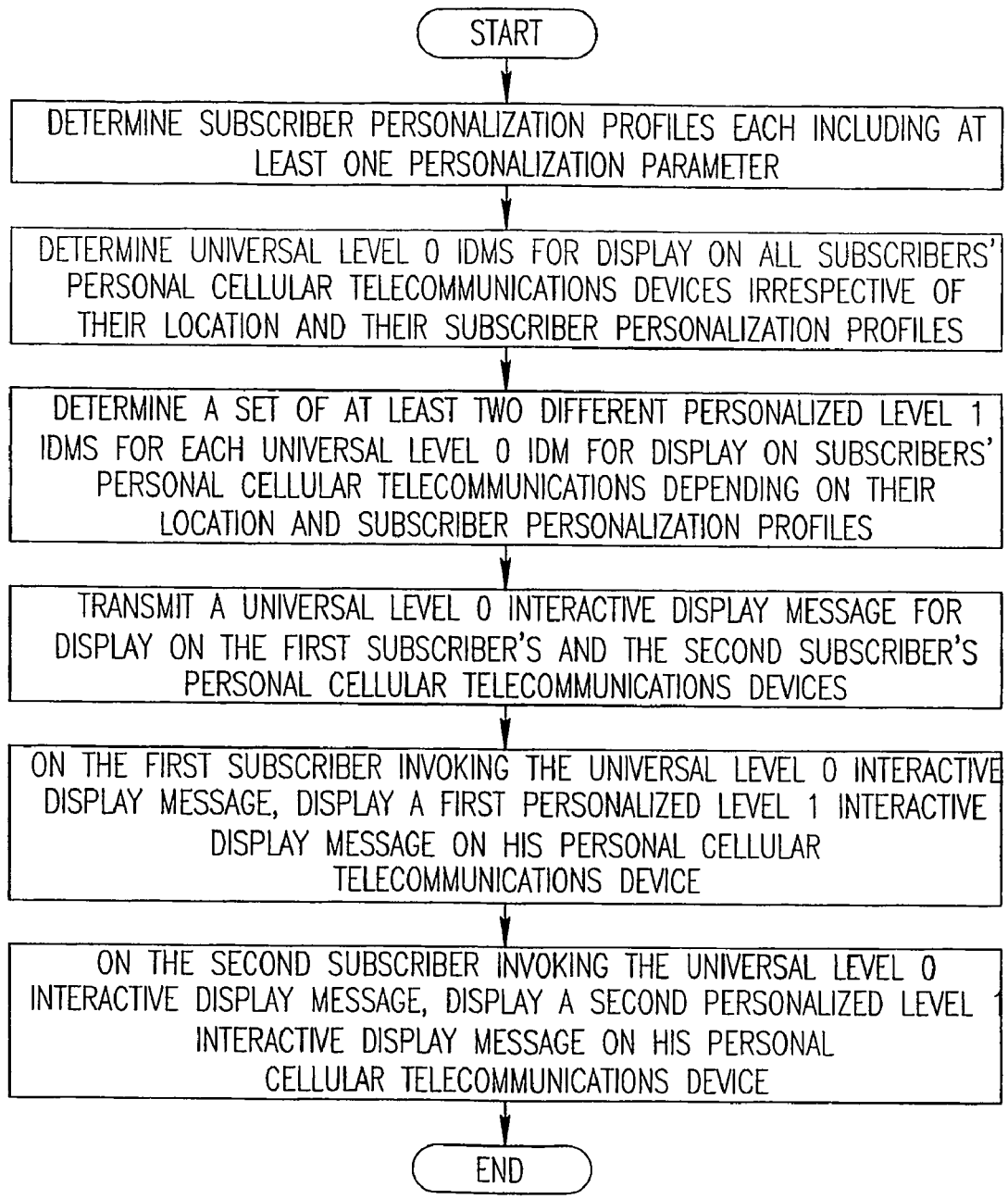
FIG. 3 is a flow chart of the top level methodology for content personalization on personal cellular telecommunications devices in accordance with the present invention.

FIG. 3 shows the top level methodology for content personalization on devices 30 including the steps of determining subscriber personalization profiles each including at least one personalization parameter, determining universal Level 0 IDMs for display on all subscribers' personal cellular telecommunications devices irrespective of their location and their subscriber personalization profiles, and determining a set of at least two different personalized Level 1 IDMs for each universal Level 0 IDM for display on subscribers' personal cellular telecommunications depending on their location and subscriber personalization profiles.

The present invention is now described with reference to the following scenario:

The personalization server 19 includes subscriber personalization profiles regarding four subscribers: John, Martin, Simon and William. John is registered as being a basketball fan and not a football fan. Martin is registered as being a football fan. Simon is also registered as being a football fan. William is registered as being a cricket fan and not a football fan.

Figure 5:
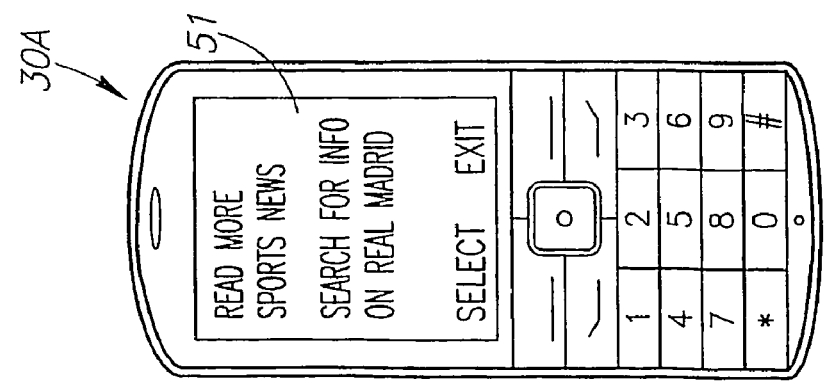
FIG. 5 is a schematic representation of a first subscriber's personal cellular telecommunications device displaying a first personalized Level 1 interactive display message "read more sports news" and "search for info on Real Madrid"

The ICS 14 includes a universal Level 0 IDM 50 with a content precursor "Real Madrid won" (see FIG. 4) and three personalized Level 1 IDMs as follows:

Level 1 IDM 51 having an interactive option menu listing two links to "read more sports news" and "search for info on Real Madrid" intended for subscribers who are registered as not being football fans (see FIG. 5).

Figure 6:
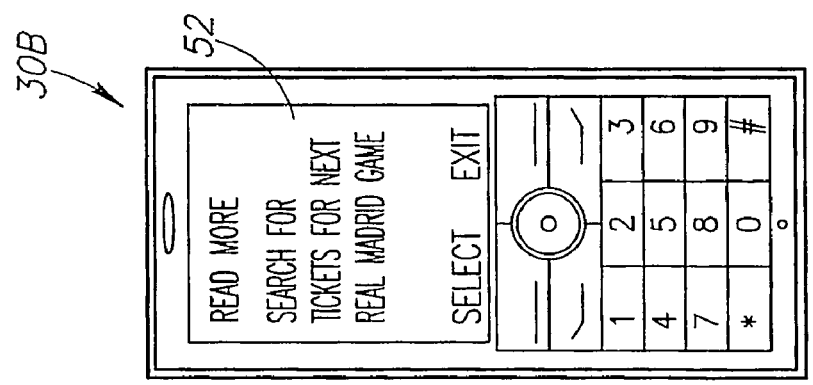
FIG. 6 is a schematic representation of a second subscriber's personal cellular telecommunications device displaying a second personalized Level 1 interactive display message "read more" and "search for tickets to the next Real Madrid game"

Level 1 IDM 52 having an interactive option menu listing two links to "read more" and "search for tickets to the next Real Madrid game" intended for subscribers who are registered as being football fans and are presently located in Madrid (see FIG. 6).

Figure 7:
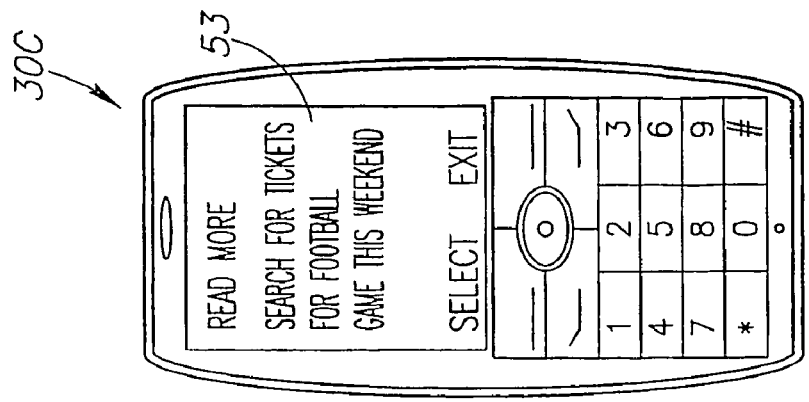
FIG. 7 is a schematic representation of a third subscriber's personal cellular telecommunications device displaying a third personalized Level 1 interactive display message "read more" and "search for tickets for football game this weekend"

Level 1 IDM 53 having an interactive option menu listing two links to "read more" and "search for tickets for football game this weekend" intended for subscribers who are registered as being football fans but are not presently located in Madrid (see FIG. 7).

John has a device 30A, and is presently located in Madrid. Martin has a device 30B, and is also presently located in Madrid. Simon has a device 30C, and is presently located in London. William has a device 30D, and is also presently located in Madrid. The BTS 13A is in bi-directional communications with John's device 30A, Martin's device 30B, and William's device 30D. The BTS 13B is in bi-directional communication with Simon's device 30C.

Figure 4:
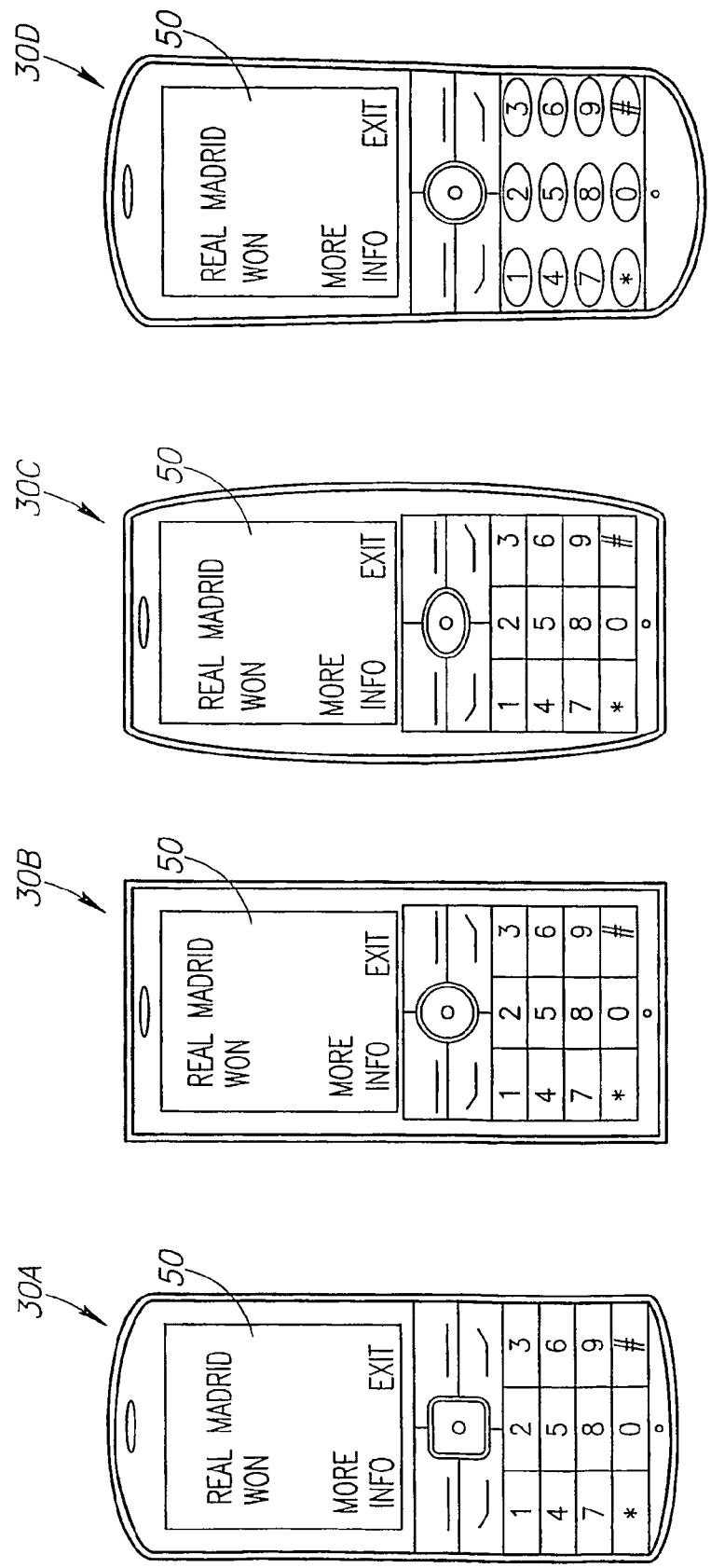
FIG. 4 is a schematic representation of four subscribers' personal cellular telecommunications devices displaying the same universal Level 0 interactive display message "Real Madrid won"

FIG. 4 shows John's device 30A, Martin's device 30B, Simon's device 30C and William's device 30D displaying the same universal Level 0 IDM 50 "Real Madrid won" irrespective of their subscriber personalization profiles and location. FIG. 5 shows John's device 30A displaying the Level 1 IDM 51 personalized for non-football fans, namely, "read more sports news" and "search for info on Real Madrid". FIG. 6 shows Martin's device 30B displaying the Level 1 IDM 52 "read more" and "search for tickets to the next Real Madrid game" by virtue of the fact that he is registered as a football fan and is located in Madrid. FIG. 7 shows Simon's device 30C displaying the Level 1 IDM 53 "read more" and "search for tickets for football game this weekend" by virtue of the fact that he is registered as a football fan and is located in London not Madrid.

Martin and Simon invoking the same WAP link "read more" on their respective devices 30B and 30C typically browse to the same WAP page, for example, including a report of the game. Martin invoking the WAP link "search for tickets to the next Real Madrid game" typically browses to Real Madrid's online ticket office for ordering tickets for their next game. Simon invoking the CHEAP link "search for tickets for football game this weekend" typically browses to a London based online ticket office for ordering tickets at a local football game.

Figure 11:
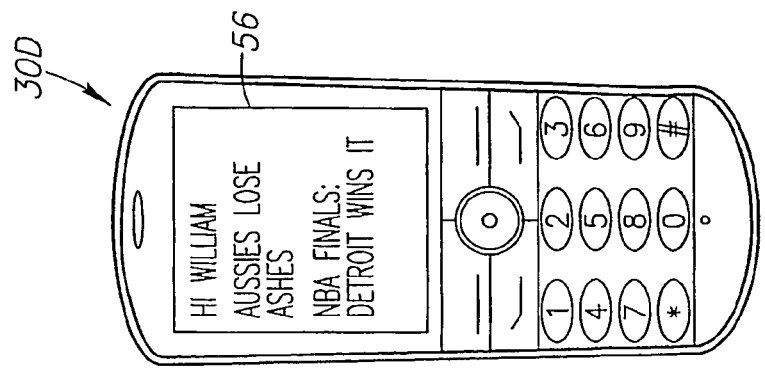
FIG. 11 is a schematic representation of the fourth subscriber's personal cellular telecommunications device displaying a second personalized WAP page.
Figure 10:
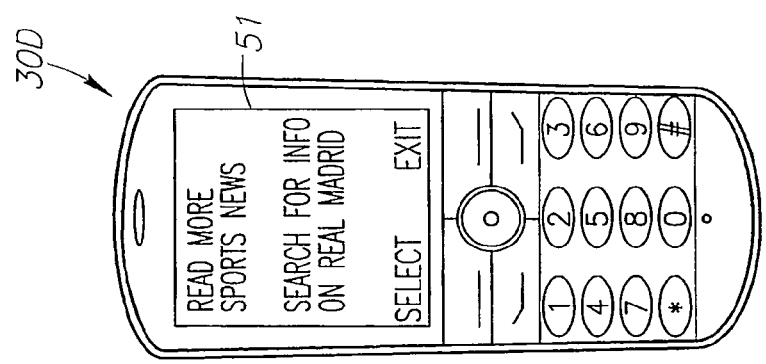
FIG. 10 is a schematic representation of a fourth subscriber's personal cellular telecommunications device displaying the first personalized Level 1 interactive display message "read more sports news" and "search for info on Real Madrid"
Figure 9:
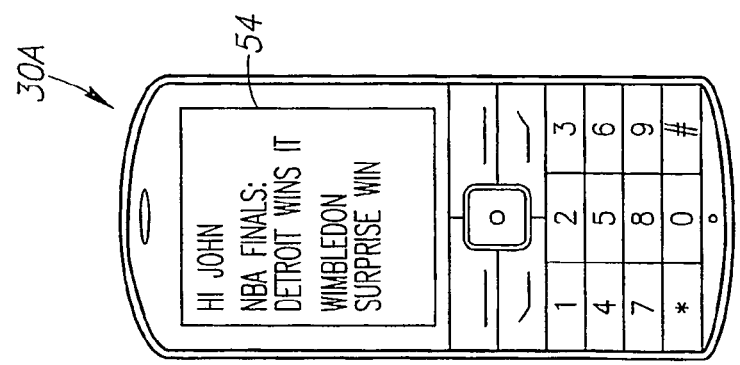
FIG. 9 is a schematic representation of the first subscriber's personal cellular telecommunications device displaying a first personalized WAP page.
Figure 8:
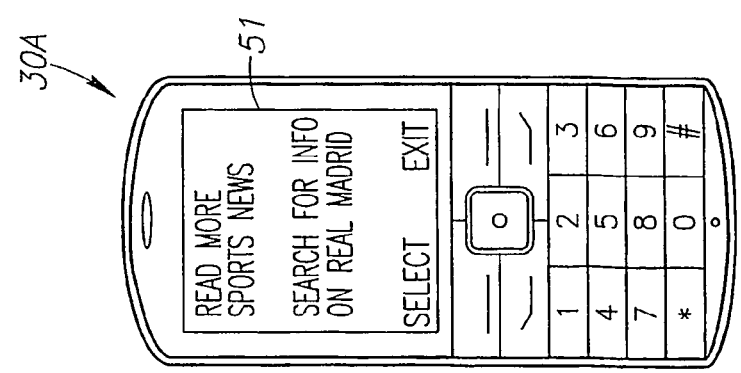
FIG. 8 is a schematic representation of the first subscriber's personal cellular telecommunications device displaying the first personalized Level 1 interactive display message "read more sports news" and "search for info on Real Madrid"

FIGS. 8 and 10 show John's device 30A and William's device 30D showing the same Level 1 IDM 51 personalized for non-football fans. John and William invoking the same WAP link "read more sports news" preferably browse to personalized WAP pages which are different by virtue of John being a registered basketball fan, and William being a registered cricket fan. FIG. 9 shows John's personalized WAP page 54 including links to "NBA finals: Detroit wins it" and "Wimbledon surprise will". FIG. 11 shows William's personalized WAP page 56 including links to "Aussies lose Ashes" and "NBA finals: Detroit wins it". John and William invoking the WAP link "search for info on Real Madrid" typically browse to the same search page, for example, Google, with results of a search using the term 'Real Madrid'.

Content personalization on personal cellular telecommunications devices in accordance with the present invention can be implemented using PTMP messages only, PTP messages only or combinations of PTMP messages and PTP messages as now described with reference to FIGS. 12 to 15.

Figure 12:
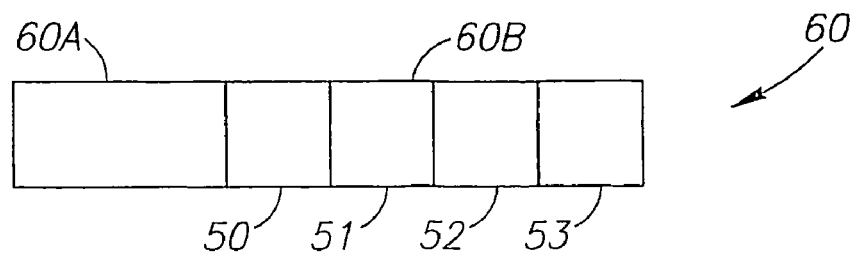
FIG. 12 is a schematic representation of a message including FIG. 4's Level 0 interactive display message, FIG. 5's Level 1 interactive display message and FIG. 6's Level 1 interactive display message.

FIG. 12 shows a message 60 including a header portion 60A and a payload portion 60B including the universal Level 0 IDM 50, the personalized Level 1 IDM 51, the personalized Level 1 IDM 52, and the personalized Level 1 IDM 53. The message 60 can be either a PTMP message or a PTP message. Content personalization in the case of messages 60 is achieved wholly handset side without any network side personalization. The header portion 60A includes inter alia instructions determining the rendering of the message 60 on subscribers' devices 30 in accordance with their subscriber personalization profiles and their location. The instructions include inter alia the personalization parameter determining the Level 1 IDM to be displayed, and the personalization parameter determining which action to be taken on invoking a Level 1 IDM. The Level 1 IDMs can be included in their entirety or alternatively elements common to two or more Level 1 IDMs can be included once to save space whereupon the header portion 60A includes instructions which elements are to be combined to display Level 1 IDMs. Thus, in the present case, the payload portion 60B may include the link "read more" appearing in the Level 1 IDMs 52 and 53 only once.

The BTS 13A transmits the message 60 to John's device 30A, Martin's device 30B, and William's device 30D, and the BTS 13B transmits the message 60 to Simon's device 30C. The devices 30A-30D display the universal Level 0 IDM 50. On John invoking same, his device 30A personalizes the message 60 to display the Level 1 IDM 51. On Martin invoking same, his device 30B personalizes the message 60 to display the Level 1 IDM 52. On Simon invoking same, his device 30C personalizes the message 60 to display the Level 1 IDM 53. On William invoking same, his device 30D personalizes the message 60 to display the same Level 1 IDM 51 as John's device 30A.

Figure 13:
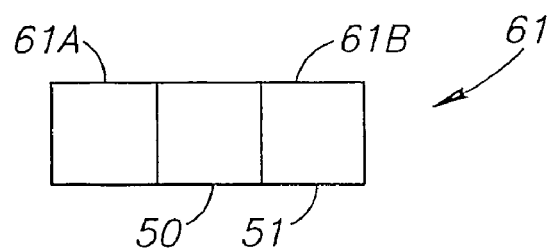
FIG. 13 is a schematic representation of a first personalized PTP message including FIG. 4's Level 0 interactive display message and FIG. 5's Level 1 interactive display message, and a second personalized PTP message including FIG. 4's Level 0 interactive display message and FIG. 6's Level 1 interactive display message.
Figure 13:
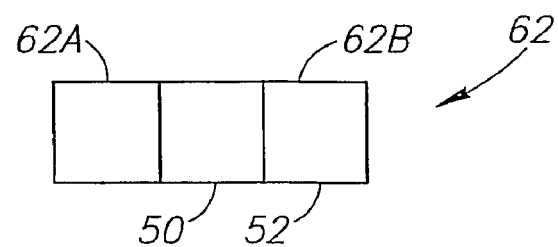
Figure 13:
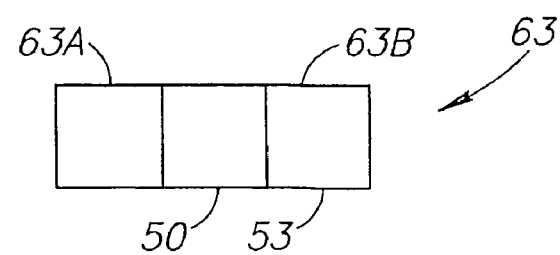

FIG. 13 shows a first personalized PTP message 61 including a header portion 61A and a payload portion 61B with the universal Level 0 IDM 50 and the Level 1 IDM 51; a second personalized PTP message 62 including a header portion 62A and a payload portion 62B with the universal Level 0 IDM 50 and the Level 1 IDM 52; and a third personalized PTP message 63 including a header portion 63A and a payload portion 63B with the universal Level 0 IDM 50 and the Level 1 IDM 53. The PTP messages 61, 62 and 63 do not require handset personalization but rather are transmitted to subscribers in accordance with their subscriber personalization profiles at the personalization server 19.

The BTS 13A transmits the PTP message 61 to John's device 30A and William's device 30D, and the PTP message 62 to Martin's device 30B and the BTS 13B transmits the PTP message 63 to Simon's device 30C. John's device 30A displays the universal Level 0 IDM 50, and on John invoking same, his device 30A displays the Level 1 IDM 51. Martin's device 30B displays the universal Level 0 IDM 50, and on Martin invoking same, his device 30B displays the Level 1 IDM 52. Simon's device 30C displays the universal Level 0 IDM 50, and on Simon invoking same, his device 30C displays the Level 1 IDM 53. William's device 30D displays the universal Level 0 IDM 50, and on William invoking same, his device 30D displays the same Level 1 IDM 51 as John's device 30A.

Figure 14:
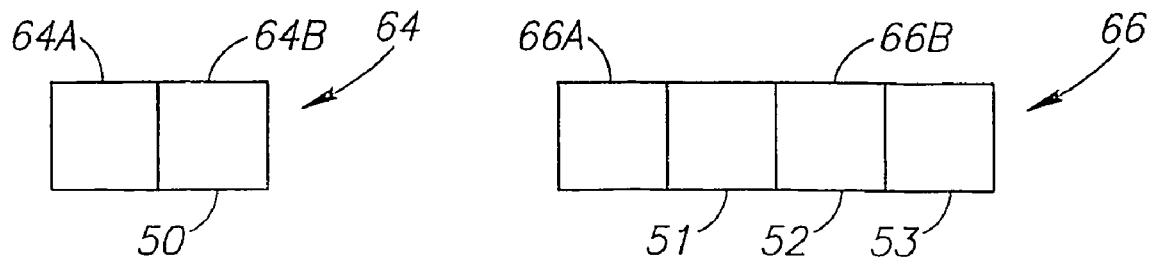
FIG. 14 is a schematic representation of a PTMP message including FIG. 4's Level 0 interactive display message, and a PTP message including FIG. 5's Level 1 interactive display message and FIG. 6's Level 1 interactive display message.

FIG. 14 shows a PTMP message 64 including a header portion 64A and a payload portion 64B with the universal Level 0 IDM 50, and a PTP message 66 including a header portion 66A and a payload portion 66B with the Level 1 IDM 51, the Level 1 IDM 52, and the Level 1 IDM 53 requiring handset side personalization. The BTS 13A transmits the PTMP message 64 to John's device 30A, Martin's device 30B and William's device 30D for displaying the universal Level 0 IDM 50 thereon, and the BTS 13B transmits the PTMP message 64 to Simon's device 30C for displaying the universal Level 0 IDM 50 thereon.

On John invoking the universal Level 0 IDM 50, the BTS 13A transmits the PTP message 66 to his device 30A for handset side personalization to display the Level 1 IDM 51. On Martin invoking the universal Level 0 IDM 50, the BTS 13A transmits the PTP message 66 to his device 30B for handset side personalization to display the Level 1 IDM 52. On Simon invoking the universal Level 0 IDM 50, the BTS 13B transmits the PTP message 66 to his device 30C for handset side personalization to display the Level 1 IDM 53. On William invoking the universal Level 0 IDM 50, the BTS 13A transmits the PTP message 66 to his device 30D for handset side personalization to display the same Level 1 IDM 51 as John's device 30A.

Figure 15:
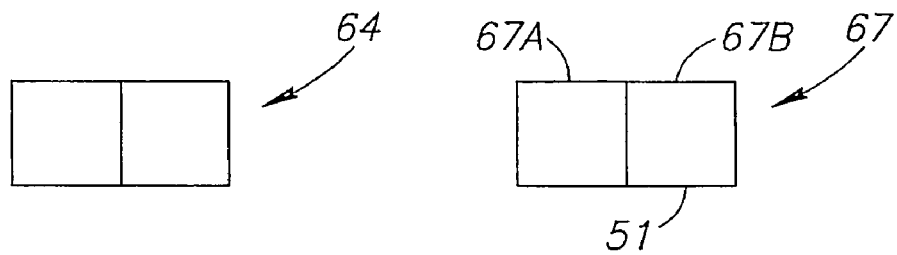
FIG. 15 is a schematic representation of a PTMP message including FIG. 4's Level 0 interactive display message, a first personalized PTP message including FIG. 5's Level 1 interactive display message and a second personalized PTP message including FIG. 6's Level 1 interactive display message.
Figure 15:
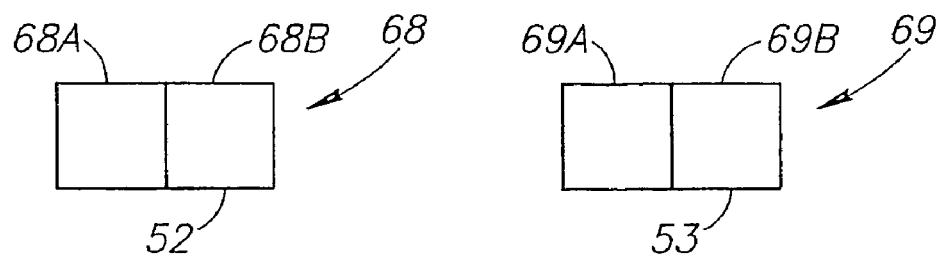

FIG. 15 shows the PTMP message 64; a first personalized PTP message 67 including a header portion 67A and a payload portion 67B with the Level 1 IDM 51; a second personalized PTP message 68 including a header portion 68A and a payload portion 68B with the Level 1 IDM 52; and a third personalized PTP message 69 including a header portion 69A and a payload portion 69B with the Level 1 IDM 53. The PTP messages 67, 68 and 69 do not require handset personalization but rather are transmitted to subscribers in accordance with their subscriber personalization profiles at the personalization server 19. The BTS 13A transmits the PTMP message 64 to John's device 30A, Martin's device 30B and William's device 30D for displaying the universal Level 0 IDM 50, and the BTS 13B transmits the PTMP message 64 to Simon's device 30C for displaying the universal Level 0 IDM 50.

On John invoking the universal Level 0 IDM 50, the BTS 13A transmits the PTP message 67 to his device 30A for displaying the Level 1 IDM 51. On Martin invoking the universal Level 0 IDM 50, the BTS 13A transmits the PTP message 68 to his device 30B for displaying the Level 1 IDM 52. On Simon invoking the universal Level 0 IDM 50, the BTS 13B transmits the PTP message 69 to his device 30C for displaying the Level 1 IDM 53. On William invoking the universal Level 0 IDM 50, the BTS 13A transmits the PTP message 69 to his device 30D for displaying the same Level 1 IDM 51 as John's device 30A.

While the invention has been described with respect to a limited number of embodiments, it will be appreciated that many variations, modifications, and other applications of the invention can be made within the scope of the appended claims. For example, although a series of acts may be described with reference to a flow diagram, the order of the acts may differ in other implementations when the performance of one act is not dependent on the other. Further, non-independent acts may be performed in parallel. Moreover, whilst the present invention has been described in parts with reference to its GSM implementation, it is suitable for implementation by both existing or still evolving technologies including inter alia PCS, GPRS, 3G, CDMA, UMTS, W-CDMA, CDMA2000 and the like, and/or both existing and still evolving services including inter alia MBMS, OMA BCAST, OMA DCD, DVB-H, DMB, and the like.

The invention claimed is:

1. Method for displaying personalized content on personal cellular telecommunications devices, the method comprising the steps of:

transmitting a universal Level 0 interactive display message to a plurality of subscribers including first and second subscribers, said universal Level 0 interactive display message including a content precursor for display on personal cellular telecommunications devices of said subscribers and having at least one response mechanism for requesting additional information associated with the content precursor of said universal Level 0 interactive display message;

on the first subscriber invoking a response mechanism of the universal Level 0 interactive display message, displaying a first personalized Level 1 interactive display message on his personal cellular telecommunications device, the content of said first personalized Level 1 interactive display message being selected based on a first value of a first personalization parameter in a subscriber personalization profile associated with said first subscriber; and on the second subscriber invoking a response mechanism of the universal Level 0 interactive display message, displaying a second personalized Level 1 interactive display message on his personal cellular telecommunications device, the content of said second personalized Level 1 interactive display message being selected based on a second value of the first personalization parameter in a subscriber personalization profile associated with said second subscriber, said second value of the first personalization parameter being different from said first value of the first personalization parameter, and said second personalized Level 1 interactive display message being different from the first personalized Level 1 interactive display message.

2. The method according to claim 1 wherein the first personalized Level 1 interactive display message and the second personalized Level 1 interactive display message include an interactive option menu having at least two response mechanisms for requesting additional information.

3. The method according to claim 2 wherein the interactive option menu includes a link for browsing to a WAP page and a link for browsing to a personalized WAP page.

4. The method according to claim 1, wherein the plurality of subscribers includes a third subscriber having a third subscriber personalization profile including the first personalization parameter having the first value, and wherein transmitting the universal Level 0 interactive display message comprises transmitting the universal Level 0 interactive display message to said first subscriber by a first base station and transmitting the universal Level 0 interactive display message to said third subscriber by a second base station, and further comprising the step of:

on the third subscriber invoking the universal Level 0 interactive display message, displaying a third personalized Level 1 interactive display message including at least one response mechanism for requesting additional information on the personal cellular telecommunications device of the third subscriber, the third personalized Level 1 interactive display message being different from the first personalized Level 1 interactive display message notwithstanding the first subscriber's and the third subscriber's subscriber personalization profiles both having the first personalization parameter with the same first value due to the third subscriber being at a location remote from the first base transmitter station.

5. The method according to claim 1, wherein the plurality of subscribers includes a fourth subscriber having a fourth subscriber personalization profile, wherein the first and fourth subscriber personalization profiles have a first personalization parameter having the first value, and wherein the first subscriber personalization profile has a second personalization parameter having a first value for initiating a first action to obtain additional information, and the fourth subscriber personalization profile has the second personalization parameter having a second value for initiating a second action to obtain additional information, and further comprising the steps of:

on the first subscriber and the fourth subscriber invoking the universal Level 0 interactive display message, displaying the same first personalized Level 1 interactive display message on their respective personal cellular telecommunications devices in accordance with their respective subscriber personalization profiles having the same first value for the first personalization parameter; and on the first subscriber and the fourth subscriber invoking the same response mechanism on the same first personalized Level 1 interactive display message on their respective personal cellular telecommunications devices, the first subscriber's personal cellular telecommunications device initiating the first action to obtain additional information in accordance with his subscriber personalization profile's second personalization parameter having the first value, and the fourth subscriber's personal cellular telecommunications device initiating the second action to obtain additional information in accordance with his subscriber personalization profile's second personalization parameter having the second value.

6. The method according to claim 1 wherein a base transmitter station transmits a message including the universal Level 0 interactive display message and at least one Level 1 interactive display message.

7. The method according to claim 6 wherein a base transmitter station transmits a message to the first subscriber's and the second subscriber's personal cellular telecommunications devices for display thereon, the message including the universal Level 0 interactive display message, the first personalized Level 1 interactive display message and the second personalized Level 1 interactive display message for handset side personalization at the first subscriber's and the second subscriber's personal cellular telecommunications devices.

8. The method according to claim 7 wherein the message is a Point To MultiPoint (PTMP) message.

9. The method according to claim 7 wherein the message is a Point To Point (PTP) message.

10. The method according to claim 6 wherein the base transmitter station transmits: i) a first personalized Point To Point (PTP) message to the first subscriber's personal cellular telecommunications device for display thereon, the first PTP message including the universal Level 0 interactive display message and the first personalized Level 1 interactive display message, and ii) a second personalized Point To Point (PTP) message to the second subscriber's personal cellular telecommunications device for display thereon, the second PTP message including the universal Level 0 interactive display message and the second personalized Level 1 interactive display message.

11. The method according to claim 1 wherein a base transmitter station transmits i) a Point To MultiPoint (PTMP) message including the universal Level 0 interactive display message to the first subscriber's and the second subscriber's personal cellular telecommunications devices for display thereon, and ii) a Point To Point (PTP) message to the first subscriber's and the second subscriber's personal cellular telecommunications device for display thereon on the first subscriber and second subscriber invoking the universal Level 0 interactive display message, the PTP message including the first personalized Level 1 interactive display message and the second personalized Level 1 interactive display message for handset side personalization at the first subscriber's and the second subscriber's personal cellular telecommunications devices.

12. The method according to claim 1 wherein a base transmitter station transmits i) a Point To MultiPoint (PTMP) message including the universal Level 0 interactive display message to the first subscriber's and the second subscriber's personal cellular telecommunications devices for display thereon, ii) a first personalized Point To Point (PTP) message including the first personalized Level 1 interactive display message to the first subscriber's personal cellular telecommunications device for display thereon on the first subscriber invoking the universal Level 0 interactive display message, and iii) a second personalized Point To Point (PTP) message including the second personalized Level 1 interactive display message to the second subscriber's personal cellular telecommunications device for display thereon on the second subscriber invoking the universal Level 0 interactive display message.

13. System for displaying personalized content on personal cellular telecommunications devices in accordance with claim 1.

14. Personal cellular telecommunications device for displaying personalized content in accordance with claim 1.

* * * * *